(12) United States Patent
Chu

(10) Patent No.: US 12,087,177 B2
(45) Date of Patent: Sep. 10, 2024

(54) EXCHANGEABLE OPTICAL PRINCIPLES DEMONSTRATING KIT

(71) Applicant: National Central University, Taoyuan (TW)

(72) Inventor: Ching-Chi Chu, Taoyuan (TW)

(73) Assignee: National Central University, Taoyuan (TW)

(*) Notice: Subject to any disclaimer, the term of this patent is extended or adjusted under 35 U.S.C. 154(b) by 224 days.

(21) Appl. No.: 17/968,942

(22) Filed: Oct. 19, 2022

(65) Prior Publication Data
US 2024/0046817 A1 Feb. 8, 2024

(30) Foreign Application Priority Data
Aug. 5, 2022 (TW) .................................. 111129628

(51) Int. Cl.
*G02B 27/00* (2006.01)
*G09B 23/22* (2006.01)

(52) U.S. Cl.
CPC .................................. *G09B 23/22* (2013.01)

(58) Field of Classification Search
CPC ........ G09B 23/22; G02B 13/08; G02B 13/06; G02B 27/0006–0075
USPC ......................................... 359/617, 725, 147
See application file for complete search history.

(56) References Cited

U.S. PATENT DOCUMENTS

| 1,414,469 | A | * | 5/1922 | House | G02B 27/08 359/617 |
| 1,485,795 | A | * | 3/1924 | Mallernee | G02B 27/08 359/617 |
| 1,662,743 | A | * | 3/1928 | Hanson | G02B 27/08 359/617 |
| 2,022,402 | A | * | 11/1935 | Canfield | G09B 23/22 434/367 |
| 2,112,642 | A | * | 3/1938 | Anketell | G02B 27/08 359/617 |
| 2,126,415 | A | * | 8/1938 | Scheele | G02B 27/08 353/43 |
| 2,484,116 | A | * | 10/1949 | Papke | A63J 15/00 359/617 |
| 3,111,878 | A | * | 11/1963 | Welles | G02B 27/08 346/33 C |
| 3,468,599 | A | * | 9/1969 | Jordan | G02B 27/022 348/832 |
| 3,809,879 | A | * | 5/1974 | Gonzalez | G02B 27/08 362/132 |

(Continued)

*Primary Examiner* — Eugene L Kim
*Assistant Examiner* — Matthew B Stanczak
(74) *Attorney, Agent, or Firm* — Demian K. Jackson; Jackson IPG PLLC

(57) ABSTRACT

The present invention relates to an exchangeable optical principles demonstrating kit. The kit includes a retractable sleeve structure having a first end and a second end; a grating plate including a grating film; and a pinhole plate including a pinhole opening, wherein the grating plate is selectively attached to the retractable sleeve structure by a magnetic connection, to render the exchangeable optical principles demonstrating kit to form an optical interference principle demonstrating device, and the pinhole plate is selectively attached to the retractable sleeve structure by a magnetic connection, to render the exchangeable optical principles demonstrating kit to form an optical pinhole principle demonstrating device.

9 Claims, 4 Drawing Sheets

(56) References Cited

U.S. PATENT DOCUMENTS

| | | | | |
|---|---|---|---|---|
| 3,841,730 A * | 10/1974 | Karelitz | G02B 27/06 | 362/346 |
| 3,957,358 A * | 5/1976 | Holliday | G02B 25/005 | 359/823 |
| 4,001,847 A * | 1/1977 | McGrath | G03B 15/003 | 396/440 |
| 4,061,414 A * | 12/1977 | Price | G02B 27/08 | 353/1 |
| 4,120,116 A * | 10/1978 | Williams | A63H 33/22 | 359/617 |
| 4,162,117 A * | 7/1979 | Gantz | G02B 27/08 | 359/617 |
| 4,231,634 A * | 11/1980 | Gantz | G02B 27/08 | 353/2 |
| 4,232,932 A * | 11/1980 | Atwater | G02B 27/08 | 359/616 |
| 4,241,977 A * | 12/1980 | Wood | G02B 27/08 | 359/616 |
| 4,259,808 A * | 4/1981 | Oakes | A63H 33/26 | 472/63 |
| 4,576,433 A * | 3/1986 | Shaughnessy | G02B 23/00 | 359/616 |
| 4,653,843 A * | 3/1987 | Karelitz | G02B 27/08 | 359/490.02 |
| 4,793,671 A * | 12/1988 | Palochak | G02B 27/08 | 359/616 |
| 4,799,764 A * | 1/1989 | Crowell | G02B 27/04 | 359/615 |
| 4,815,801 A * | 3/1989 | Anderson | G02B 27/08 | 359/616 |
| 4,854,657 A * | 8/1989 | Scott | G02B 27/08 | 359/617 |
| 5,108,293 A * | 4/1992 | Stack | G09B 23/22 | 356/336 |
| 5,172,270 A * | 12/1992 | Peiperl | A63H 33/22 | 359/617 |
| 5,229,884 A * | 7/1993 | Kelderhouse | G02B 27/08 | 359/616 |
| 5,469,297 A * | 11/1995 | Marshall | G02B 27/08 | 359/616 |
| 5,786,938 A * | 7/1998 | Chang | G02B 27/08 | 359/617 |
| 6,778,342 B1 * | 8/2004 | Chang | H05K 9/0096 | 359/893 |
| 6,783,285 B1 * | 8/2004 | Alexeff | G03B 19/16 | 348/164 |
| 7,207,682 B2 * | 4/2007 | Stephens | G02B 27/08 | 359/616 |
| 7,420,749 B2 * | 9/2008 | Grant | G02B 23/18 | 359/725 |
| 7,477,386 B2 * | 1/2009 | Saha | G01N 21/21 | 446/491 |
| 10,183,231 B1 * | 1/2019 | Lowe | A63H 33/22 | |
| 10,539,813 B2 * | 1/2020 | Saha | G02B 1/04 | |
| 2004/0142627 A1 * | 7/2004 | Steinberg | A63H 33/28 | 446/16 |
| 2007/0223099 A1 * | 9/2007 | Bailey | G02B 27/08 | 359/616 |
| 2007/0223100 A1 * | 9/2007 | Grant | G02B 3/005 | 359/671 |
| 2012/0200828 A1 * | 8/2012 | Chien | G03B 21/28 | 353/1 |
| 2012/0289119 A1 * | 11/2012 | Comarow | A63H 33/22 | 446/219 |
| 2021/0033875 A1 * | 2/2021 | Rosato | G02B 27/08 | |

* cited by examiner

EXCHANGEABLE OPTICAL PRINCIPLES DEMONSTRATING KIT

CROSS-REFERENCE TO RELATED APPLICATION

This application claims priority benefit to Taiwan Invention Patent Application Serial No. 111129628, filed on Aug. 5, 2022, in Taiwan Intellectual Property Office, the entire disclosures of which are incorporated by reference herein.

FIELD

The present invention relates to an exchangeable optical principles demonstrating kit, in particular to an exchangeable optical principles demonstrating kit that is configurable by exchanging and attaching different accessories to differently configure into an optical interference principle demonstrating device or an optical pinhole principle demonstrating device.

BACKGROUND

In the field of basic science education, the teaching of optical principles has always been very fundamental and important. The principles and knowledge of, from the basic light propagation characteristics, light refraction phenomenon, light reflection phenomenon and pinhole imaging, to the advanced optical electromagnetic spectrum and spectrometer, etc., have always been the focus of the teaching of optical principles.

Currently, in the traditional teaching process of optical principles, educators usually explain these optical principles to learners by means of showing drawings together with the explanation of mathematical formulas. Some simple teaching aids have been used by good teachers, so that learners can see the characteristics of these light principles and the actual phenomena in real in addition to the abstract drawings and formulas.

As far as the teaching aids of spectrometer are concerned, the commonly used teaching aids of spectrometer usually have a larger volume. Some versions of the teaching aids are a bit bulky, and are usually expensive and not easy to obtain and maintain. If the teaching aids are in simple versions made by DIY hand-made manner using the materials in life, such as optical disks, buckets, etc., such teaching aids are generally not precise and durable enough. The teaching aids of pinhole imaging experiment have the similar situations.

But most importantly, no educator has ever thought about integrating the two unrelated teaching devices, i.e., the teaching aids of spectrometer and the teaching aids of pinhole imaging, to a certain degree, and further making them into a more lightweight and palm-sized version of teaching aids.

Hence, there is a need to solve the above deficiencies/issues.

SUMMARY

The present invention relates to a stratum deformation monitoring device, in particular to a tratum deformation monitoring device, system and method that are built up based on a Brillouin frequency shift technology, in which a strain optical fiber and a temperature optical fiber act as master sensors.

The present invention provides an exchangeable optical principles demonstrating kit. The kit includes a retractable sleeve structure formed by a first sleeve structure and a second sleeve structure which are fitted with each other and having a first end including a first end magnetic connector and a second end including a second end magnetic connector; a grating plate including a grating film and a grating plate magnetic connector; and a pinhole plate including a pinhole opening and a pinhole plate magnetic connector, wherein the grating plate is selectively attached to the retractable sleeve structure by a magnetic connection between the grating plate magnetic connector and the first end magnetic connector, to render the exchangeable optical principles demonstrating kit to form an optical interference principle demonstrating device, and the pinhole plate is selectively attached to the retractable sleeve structure by a magnetic connection between the pinhole plate magnetic connector and the first end magnetic connector, to render the exchangeable optical principles demonstrating kit to form an optical pinhole principle demonstrating device.

Preferably, the exchangeable optical principles demonstrating kit further includes one of a slit plate including a slit opening and a slit plate magnetic connector, wherein the slit plate is selectively attached to the second end of the retractable sleeve structure by a magnetic connection between the slit plate magnetic connector and the second end magnetic connector; a light permeable film plate including a light permeable film and a light permeable film plate magnetic connector, wherein the light permeable film plate is selectively attached to the second end of the retractable sleeve structure by a magnetic connection between the light permeable film plate magnetic connector and the second end magnetic connector; the first end further including a first opening; and the second end further including a second opening.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation of the invention and many of the attendant advantages thereof are readily obtained as the same become better understood by reference to the following detailed description when considered in connection with the accompanying drawing, wherein.

DETAILED DESCRIPTION

Figure 1:
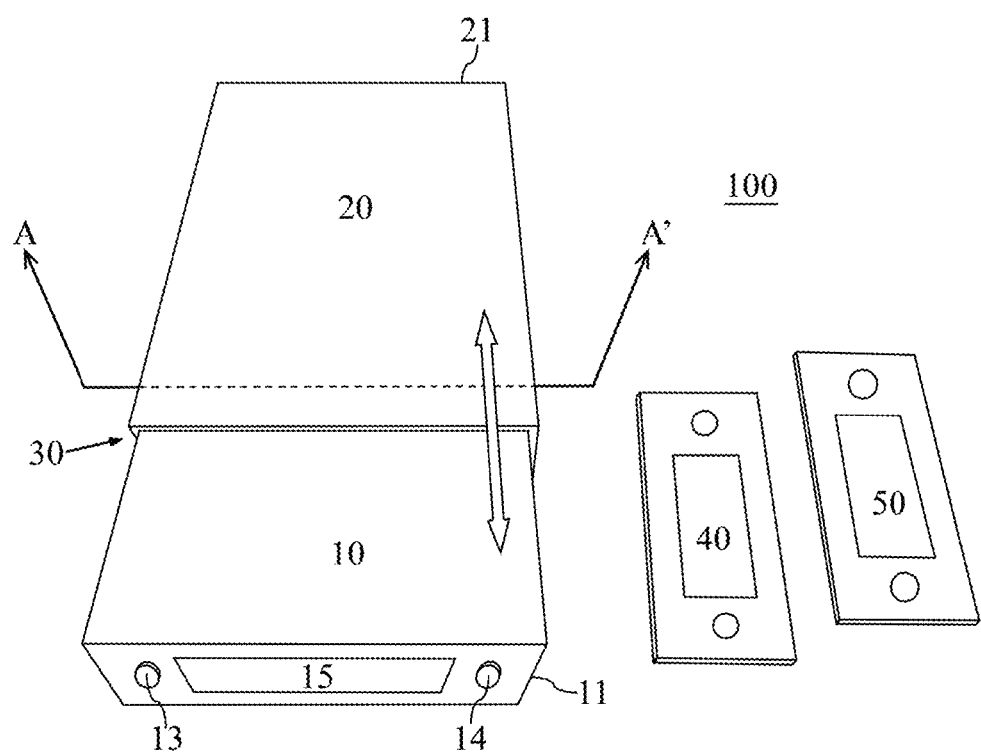
FIG. 1 is a schematic diagram illustrating the three-dimensional structure for an exchangeable optical principles demonstrating kit included in the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "including," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

Figure 2:
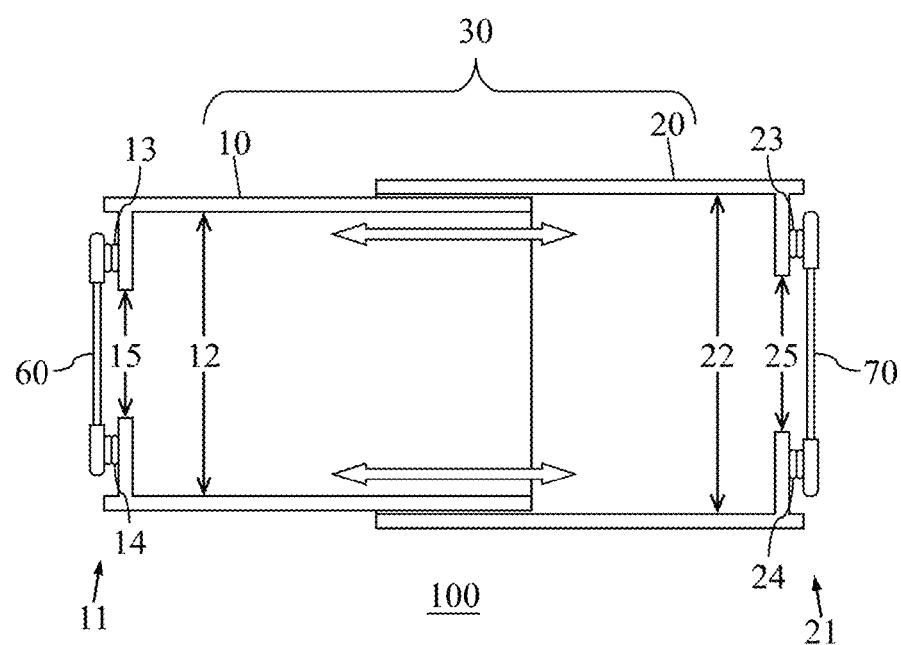
FIG. 2 is a cross-sectional view schematic diagram illustrating the structure for the exchangeable optical principles demonstrating kit included in the present invention along the AA' cross section line as shown in FIG. 1.

FIG. 1 is a schematic diagram illustrating the three-dimensional structure for an exchangeable optical principles demonstrating kit included in the present invention. FIG. 2 is a cross-sectional view schematic diagram illustrating the structure for the exchangeable optical principles demonstrating kit included in the present invention along the AA' cross section line as shown in FIG. 1. The exchangeable optical principles demonstrating kit 100 according to the present invention includes a core retractable sleeve structure 30. The retractable sleeve structure 30 includes a first sleeve structure 10 and a second sleeve structure 20, and the first sleeve structure 10 and the second sleeve structure 20 are movably fitted with each other. After the first sleeve structure 10 and the second sleeve structure 20 are fitted, the first sleeve structure 10 can still move relative to the second sleeve structure 20, and vice versa, the second sleeve structure 20 can also move relative to the first sleeve structure 10.

The first sleeve structure 10 and the second sleeve structure 20 are preferably in the shape of a square, a rectangle or a circle with a certain thickness. The first sleeve structure 10 and the second sleeve structure 20 have a first inner diameter 12 and a second inner diameter 22, respectively. The first inner diameter 12 and the second inner diameter 22 are the widths or diameters after deducting the thickness. Preferably, the first inner diameter 12 of the first sleeve structure 10 is smaller than the second inner diameter 22 of the second sleeve structure 20.

The first sleeve structure 10 further has a first end 11, and the second sleeve structure 20 further has a second end 21. The first end 11 of the first sleeve structure 10 is provided with a first opening 15. The first end 11 is provided with a plurality of first end magnetic connectors 13 and 14 disposed around the first opening 15. The second end 21 of the second sleeve structure 20 is provided with a second opening 25. The second end 21 is provided with a plurality of second end magnetic connectors 23 and 24 disposed around the second opening 25.

Preferably, a grating plate 40 or a pinhole plate 60 can be selectively attached to the first end 11 of the retractable sleeve structure 30, that is, the first end 11 of the first sleeve structure 10. Preferably, a slit plate 50 or an optical film plate 70 can be selectively attached to the second end 21 of the retractable sleeve structure 30, that is, the second end 21 of the second sleeve structure 20.

Figure 3:
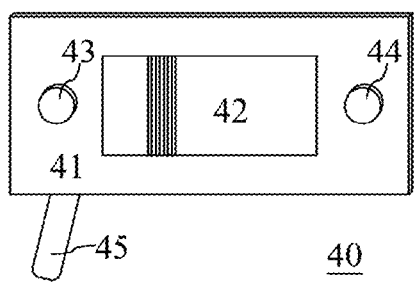
FIG. 3 is a schematic diagram illustrating a grating plate included in the present invention.
Figure 4:
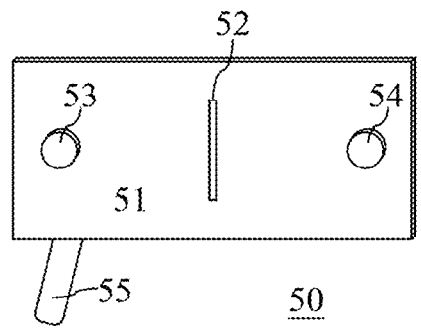
FIG. 4 is a schematic diagram illustrating a slit plate included in the present invention.

FIG. 3 is a schematic diagram illustrating a grating plate included in the present invention. FIG. 4 is a schematic diagram illustrating a slit plate included in the present invention. The exchangeable optical principles demonstrating kit 100 according to the present invention further includes a pair of the grating plate 40 and the slit plate 50 for forming an optical interference principle demonstrating device. The grating plate 40 includes a soft substrate 41, a grating film 42 attached to the soft substrate 41, a plurality of grating plate magnetic connectors 43 and 44, and a quick-release hand strip 45. The slit plate 50 includes a soft substrate 51, a slit opening 52 disposed on the soft substrate 51 as a light entrance slit, a plurality of slit plate magnetic connectors 53 and 54, and a quick-release hand strip 55. The width of the slit opening 52 is preferably less than 1 mm.

The grating plate 40 and the slit plate 50 can also be regarded as a set of parts of the optical interference principle demonstrating device. After the grating plate 40 and the slit plate 50 are attached to the retractable sleeve structure 30, the exchangeable optical principles demonstrating kit 100 can be modified into an optical interference principle demonstrating device.

Figure 5:
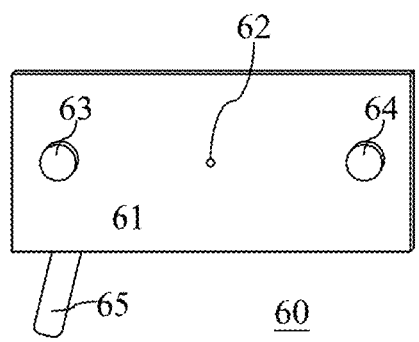
FIG. 5 is a schematic diagram illustrating a pinhole plate included in the present invention.
Figure 6:
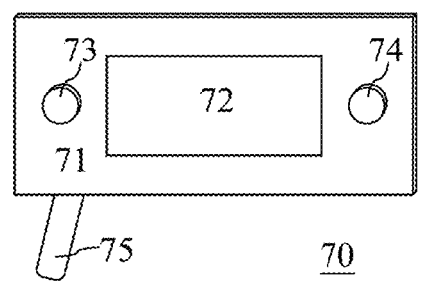
FIG. 6 is a schematic diagram illustrating an optical film plate included in the present invention.

FIG. 5 is a schematic diagram illustrating a pinhole plate included in the present invention. FIG. 6 is a schematic diagram illustrating an optical film plate included in the present invention. The exchangeable optical principles demonstrating kit 100 according to the present invention further includes a pair of the pinhole plate 60 and the optical film plate 70 for forming an optical pinhole principle demonstrating device. The pinhole plate 60 includes a soft substrate 61, a pinhole opening 62 disposed on the soft substrate 61, a plurality of pinhole plate magnetic connectors 63 and 64, and a quick-release hand strip 65. The pinhole opening 62 has an aperture that is preferably less than 1 mm. The optical film plate 70 includes a soft substrate 71, a light permeable film 72 attached to the soft substrate 71, a plurality of optical film plate magnetic connectors 73 and 74, and a quick-release hand strip 75. The light permeable film 72 is preferably a tracing paper or an optical film.

The pinhole plate 60 and the optical film plate 70 can also be regarded as a set of parts of the optical pinhole principle demonstrating device. After the pinhole plate 60 and the optical film plate 70 are attached to the retractable sleeve structure 30, the exchangeable optical principles demonstrating kit 100 can be modified into an optical pinhole principle demonstrating device.

The materials used to make the first sleeve structure 10, the second sleeve structure 20, and the soft substrates 41, 51, 61, and 71 are preferably selected from paper based materials, polyethylene terephthalate (PET) based materials, polyethylene (PE) based materials, high density polyethylene (HDPE) based materials, polyvinyl chloride (PVC) based materials, polypropylene (PP) based materials, polycarbonate (PC) based materials, polylactic acid (PLA) based materials, or a combination thereof.

The exchangeable optical principles demonstrating kit 100 according to the present invention can alternatively form an optical interference principle demonstrating device or an optical pinhole principle demonstrating device by exchanging different sets of parts, such as the set of parts of the optical interference principle demonstrating device or the set of parts of the optical pinhole principle demonstrating device, on the same retractable sleeve structure 30.

Figure 7:
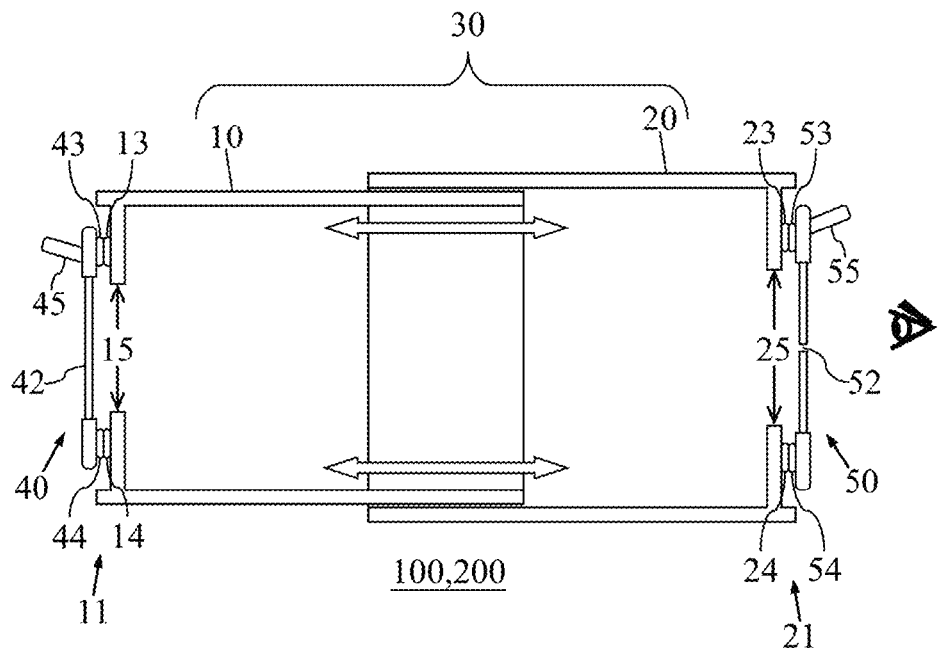
FIG. 7 is a schematic diagram illustrating an optical interference principle demonstrating device for a first embodiment of the exchangeable optical principles demonstrating kit according to the present invention.

FIG. 7 is a schematic diagram illustrating an optical interference principle demonstrating device for a first embodiment of the exchangeable optical principles demonstrating kit according to the present invention. In the first embodiment, the grating plate 40 included in the set of parts of the optical interference principle demonstrating device can be attached to the first end 11 of the first sleeve structure 10, preferably, by attaching the plurality of grating plate magnetic connectors 43 and 44 disposed on the grating plate 40 to the plurality of first end magnetic connectors 13 and 14 disposed on the first end 11 of the first sleeve structure 10 such that the grating plate magnetic connectors 43 and 44 are magnetically connected to the first end magnetic connectors 13 and 14.

Also, the slit plate 50 included in the set of parts of the optical interference principle demonstrating device can be attached to the second end 21 of the second sleeve structure 20, preferably, by attaching the plurality of slit plate magnetic connectors 53 and 54 disposed on the slit plate 50 to the plurality of second end magnetic connectors 23 and 24 disposed on the second end 21 of the second sleeve structure 20 such that the slit plate magnetic connectors 53 and 54 are magnetically connected to the second end magnetic connectors 23 and 24. The slit plate 50 and the grating plate 40 can be easily removed from the retractable sleeve structure 30 by a user by simply pulling the quick-release hand strips 55 and 45 on the slit plate 50 and the grating plate 40, respectively.

Preferably, the grating film 42 included in the grating plate 40 corresponds to the first opening 15 disposed on the first end 11 in position, and the slit opening 52 included in the slit plate 50 corresponds to the second opening 25 disposed on the second end 21 in position.

After the grating plate 40 and the slit plate 50 are respectively attached to the first end 11 and the second end 21 of the retractable sleeve structure 30, the exchangeable optical principles demonstrating kit 100 according to the present invention will turn into an optical interference principle demonstrating device 200. The first end 11 of the optical interference principle demonstrating device 200 is preferably used as a light entrance port, and the second end 21 is preferably used as an observation port. However, on the contrary, the first end 11 can preferably be used as an observation port, and the second end 21 can preferably be used as a light entrance port.

In the embodiment, after the grating plate 40 including the grating and the slit plate 50 including the slit are respectively attached to the first end 11 and the second end 21 by means of the magnetic attraction force of the magnets, as long as the grating on the first end 11 of the optical interference principle demonstrating device 200 is aligned with a specific light source, a user can see the spectrum of the light source from the slit on the observation port at the second end 22.

Figure 8:
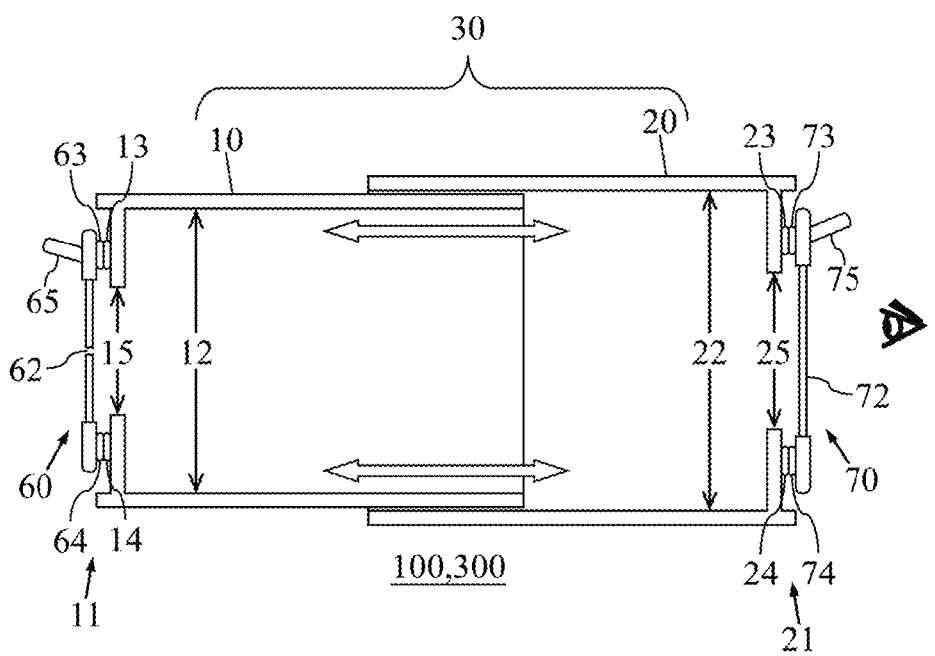
FIG. 8 is a schematic diagram illustrating an optical pinhole principle demonstrating device for a second embodiment of the exchangeable optical principles demonstrating kit according to the present invention.

FIG. 8 is a schematic diagram illustrating an optical pinhole principle demonstrating device for a second embodiment of the exchangeable optical principles demonstrating kit according to the present invention. In the second embodiment, the pinhole plate 60 included in the set of parts of the optical pinhole principle demonstrating device can be attached to the first end 11 of the first sleeve structure 10, preferably, by attaching the plurality of pinhole plate magnetic connectors 63 and 64 disposed on the pinhole plate 60 to the plurality of first end magnetic connectors 13 and 14 disposed on the first end 11 of the first sleeve structure 10 such that the pinhole plate magnetic connectors 63 and 64 are magnetically connected to the first end magnetic connectors 13 and 14.

Also, the optical film plate 70 included in the set of parts of the optical pinhole principle demonstrating device can be attached to the second end 21 of the second sleeve structure 20, preferably, by attaching the plurality of optical film plate magnetic connectors 73 and 74 disposed on the optical film plate 70 to the plurality of second end magnetic connectors 23 and 24 disposed on the second end 21 of the second sleeve structure 20 such that the optical film plate magnetic connectors 73 and 74 are magnetically connected to the second end magnetic connectors 23 and 24. The pinhole plate 60 and the optical film plate 70 can be easily removed from the retractable sleeve structure 30 by a user by simply pulling the quick-release hand strips 65 and 75 on the pinhole plate 60 and the optical film plate 70, respectively.

Preferably, the pinhole opening 62 included in the pinhole plate 60 corresponds to the first opening 15 disposed on the first end 11 in position, and the light permeable film 72 included in the optical film plate 70 corresponds to the second opening 25 disposed on the second end 21 in position.

After the pinhole plate 60 and the optical film plate 70 are respectively attached to the first end 11 and the second end 21 of the retractable sleeve structure 30, the exchangeable optical principles demonstrating kit 100 according to the present invention will turn into an optical pinhole principle demonstrating device 300. The first end 11 of the optical pinhole principle demonstrating device 300 is preferably used as a light entrance port, and the second end 21 is preferably used as an observation port. However, conversely, the first end 11 can preferably be used as an observation port, and the second end 21 can preferably be used as a light entrance port.

In the embodiment, after the pinhole plate 60 including the pinhole and the optical film plate 70 including the tracing paper are respectively attached to the first end 11 and the second end 21 by means of the magnetic attraction force of the magnets, as long as the pinhole on the first end 11 of the optical pinhole principle demonstrating device 300 is aligned with a specific light source, a user can see an upside-down image of the scene on a tracing paper screen on the observation port at the second end 22.

Therefore, the exchangeable optical principles demonstrating kit 100 according to the present invention forms an optical interference principle demonstrating device or an optical pinhole principle demonstrating device, respectively, by exchanging the different set of parts of the optical interference principle demonstrating device and set of parts of the optical pinhole principle demonstrating device on the same retractable sleeve structure 30. The exchangeable optical principles demonstrating kit 100 is a multi-functional optical demonstrating teaching aid component that enables leaners to see these optical characteristics and phenomena in real, so as to facilitate the leaners to understand and learn more impressively.

The present invention is a multi-functional optical experimental teaching aid, which can be used for pinhole imaging and visible light spectrum experiments. The two experiments share the same main structure, and different purposes of experiments can be achieved by replacing key components. The main structure is a design of a retractable sleeve structure, which is used to adjust the optimal vision distance to facilitate the observation. A dark room is formed by a double-box type sleeve structure, where the inner box is light impermeable to facilitate optical experiments. The key components are grating magnetic connectors, pinhole magnetic connectors, slit magnetic connectors, and screen magnetic connectors. The design principle of these magnetic connectors is to quickly replace the key components by using the magnetic attraction, so as to form a pinhole imaging or spectrometer teaching aid.

The present invention provides a retractable structure in the design of sleeves, and magnetic attraction devices are arranged at the front and rear. After assembly, a composite structure that is sealed and light impermeable can be formed. There are openings disposed at the front and rear of the structure, one of the openings is the light entrance port and the other of the openings is the observation port. By arranging the pinhole magnetic connectors on the light entrance port, aligning with a specific scene, and arranging the screen magnetic connectors on the observation port, the image of the scene on the screen can be seen. By arranging the slit magnetic connectors on the light entrance port, aligning with a specific light source, and arranging the grating magnetic connectors on the observation port, the spectrum of the light source can be seen.

In the present invention, not only the two experiments of the pinhole imaging and the visible light spectrum are designed into the same structure, but also the key components can be quickly replaced by using the principle of magnetic attraction, which can change the type of experiments, such as but not limited to, pinhole imaging or spectrometer, or can change observation parameters, such as but not limited to, pinholes having different aperture sizes, pinholes having different shapes, grating films having different densities of fringes, slit sheets having different slit widths, and so on, for scientific exploration.

The present invention also includes the following features:

(I) Portability: According to the present invention, the bulky spectrometer used in the laboratory is reduced to a size that can be taken with one hand. Also, the invention can be made by the light impermeable and lightweight materials such as thick cardboard and hard plastic, which are convenient to carry.

(II) Retractable and adjustable: The definition and resolution of the spectrum is directly related to the design and size of the darkroom. According to the interference formula in physics, when the distance between the light entrance and the grating is farther, the spectral fringes will also be more separated, which can improve the resolution that is identified by the naked eye. In addition, different users have different vision distances with the naked eye. By adjusting the length of the spectrometer, the most suitable observation conditions for everyone can be achieved.

(III) The module of magnetic key components: The present invention provides a retractable structure in the design of sleeves, and magnetic attraction devices are arranged at the front and rear. After assembly, a composite structure that is sealed and light impermeable can be formed. There are openings disposed at the front and rear of the structure, one of the openings is the light entrance port and the other of the openings is the observation port. By arranging the pinhole magnetic connectors on the light entrance port, aligning with a specific scene, and arranging the screen magnetic connectors on the observation port, the image of the scene on the screen can be seen. By arranging the slit magnetic connectors on the light entrance port, aligning with a specific light source, and arranging the grating magnetic connectors on the observation port, the spectrum of the light source can be seen. All of the key components are switched in less than one second, being fast and easy.

(IV) Low cost but high precision: Compared with generic products, the materials used in the present invention have relatively low costs in materials, but the functions according to the present invention are not inferior to the generic products. When used as a spectrometer, various spectra such as continuous spectrum, absorption spectrum, emission spectrum, and so on can be clearly observed. Taking the absorption spectrum as an example, the Fraunhofer lines of sunlight can also be clearly seen with the naked eye, with very high precision.

(V) Other characteristics: The present invention further has the following characteristics: handheld, portable, miniaturized, flexible, printing-made, non-electronic device, and non-electric driven, etc.

Preferably, a teaching aid capable of both pinhole principle and spectrometer demonstrating capabilities is proposed by the present invention. The overall technical features according to the present invention can be described as follows:

(A) A basic retractable structure, a set of parts of pinhole principle, and a set of parts of spectrometer made of soft materials are included. The basic retractable structure includes a set of sleeve structures, including an outer sleeve having a larger outer diameter and an inner sleeve having a smaller outer diameter. The outer sleeve and the inner sleeve have been fitted with each other.

(B) At least two demonstrating modes can be generated by the basic retractable structure by exchanging different sets of parts. A first demonstrating mode is used to demonstrate the pinhole principle. The pinhole plate and the optical film plate included in the set of parts of pinhole principle are embedded/snapped into the outer sleeve or the outer end of the inner sleeve, or the two ends of the sleeve structure according to different sizes of the plates, thereby constituting a pinhole device.

(C) A second demonstrating mode is used to demonstrate the principle of spectrometer. The grating plate and the optical film plate included in the set of parts of spectrometer are embedded/snapped into the outer sleeve or the outer end of the inner sleeve, or the two ends of the sleeve structure according to different sizes of the plates, thereby constituting a spectrometer.

(D) These two modes share the same basic retractable structure, such as a sleeve structure, but different sets of parts are attached to the sleeve structure to constitute different devices so as to demonstrate different physical principles.

There are further embodiments provided as follows.

Embodiment 1

An exchangeable optical principles demonstrating kit, includes: a retractable sleeve structure formed by a first sleeve structure and a second sleeve structure which are fitted with each other and having a first end including a first end magnetic connector and a second end including a second end magnetic connector; a grating plate including a grating film and a grating plate magnetic connector; and a pinhole plate including a pinhole opening and a pinhole plate magnetic connector, wherein the grating plate is selectively attached to the retractable sleeve structure by a magnetic connection between the grating plate magnetic connector and the first end magnetic connector, to render the exchangeable optical principles demonstrating kit to form an optical interference principle demonstrating device, and the pinhole plate is selectively attached to the retractable sleeve structure by a magnetic connection between the pinhole plate magnetic connector and the first end magnetic connector, to render the exchangeable optical principles demonstrating kit to form an optical pinhole principle demonstrating device.

Embodiment 2

The exchangeable optical principles demonstrating kit as described in Embodiment 1 further includes one of: a slit plate including a slit opening and a slit plate magnetic connector, wherein the slit plate is selectively attached to the second end of the retractable sleeve structure by a magnetic connection between the slit plate magnetic connector and the second end magnetic connector; a light permeable film plate including a light permeable film and a light permeable film plate magnetic connector, wherein the light permeable film plate is selectively attached to the second end of the retractable sleeve structure by a magnetic connection between the light permeable film plate magnetic connector and the second end magnetic connector; the first end further including a first opening; and the second end further including a second opening.

Embodiment 3

The exchangeable optical principles demonstrating kit as described in Embodiment 2, the grating plate, the pinhole plate, the slit plate and the light permeable film plate include a quick-release hand strip providing for a user to remove the grating plate, the pinhole plate, the slit plate and the light permeable film plate from the retractable sleeve structure.

Embodiment 4

The exchangeable optical principles demonstrating kit as described in Embodiment 2, the light permeable film is selected from one of a tracing paper and an optical film.

Embodiment 5

The exchangeable optical principles demonstrating kit as described in Embodiment 2, the grating film and the pinhole opening are corresponded to the first opening in position and the slit opening and the light permeable film are corresponded to the second opening in position.

Embodiment 6

The exchangeable optical principles demonstrating kit as described in Embodiment 1, the first sleeve structure and the second sleeve structure are light impermeable and fitted with each other to form the retractable sleeve structure that is retractable.

Embodiment 7

The exchangeable optical principles demonstrating kit as described in Embodiment 1, the first sleeve structure and the second sleeve structure include a material selected from a paper based material, a PET based material, a PE based material, a HDPE based material, a PVC based material, a PP based material, a PC based material, a PLA based material and a combination thereof.

Embodiment 8

The exchangeable optical principles demonstrating kit as described in Embodiment 1, the exchangeable optical principles demonstrating kit forms the optical interference principle demonstrating device or the optical pinhole principle demonstrating device by exchanging the grating plate and the pinhole plate attached on the same retractable sleeve structure.

Embodiment 9

The exchangeable optical principles demonstrating kit as described in Embodiment 1, the pinhole opening has an aperture less than 1 mm and the slit opening has a width less than 1 mm.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. An exchangeable optical principles demonstrating kit, comprising:
    a retractable sleeve structure formed by a first sleeve structure and a second sleeve structure which are fitted with each other and having a first end comprising a first end magnetic connector and a second end comprising a second end magnetic connector;
    a grating plate comprising a grating film and a grating plate magnetic connector; and
    a pinhole plate comprising a pinhole opening and a pinhole plate magnetic connector,
    wherein the grating plate is selectively attached to the retractable sleeve structure by a magnetic connection between the grating plate magnetic connector and the first end magnetic connector, to render the exchangeable optical principles demonstrating kit to form an optical interference principle demonstrating device, and the pinhole plate is selectively attached to the retractable sleeve structure by a magnetic connection between the pinhole plate magnetic connector and the first end magnetic connector, to render the exchangeable optical principles demonstrating kit to form an optical pinhole principle demonstrating device.

2. The exchangeable optical principles demonstrating kit as claimed in claim 1, further comprising one of:
    a slit plate comprising a slit opening and a slit plate magnetic connector, wherein the slit plate is selectively attached to the second end of the retractable sleeve structure by a magnetic connection between the slit plate magnetic connector and the second end magnetic connector;
    a light permeable film plate comprising a light permeable film and a light permeable film plate magnetic connector, wherein the light permeable film plate is selectively attached to the second end of the retractable sleeve structure by a magnetic connection between the light permeable film plate magnetic connector and the second end magnetic connector;

the first end further comprising a first opening; and the second end further comprising a second opening.

3. The exchangeable optical principles demonstrating kit as claimed in claim 2, wherein the grating plate, the pinhole plate, the slit plate and the light permeable film plate comprise a quick-release hand strip providing for a user to remove the grating plate, the pinhole plate, the slit plate and the light permeable film plate from the retractable sleeve structure.

4. The exchangeable optical principles demonstrating kit as claimed in claim 2, wherein the light permeable film is selected from one of a tracing paper and an optical film.

5. The exchangeable optical principles demonstrating kit as claimed in claim 2, wherein the grating film and the pinhole opening are corresponded to the first opening in position and the slit opening and the light permeable film are corresponded to the second opening in position.

6. The exchangeable optical principles demonstrating kit as claimed in claim 1, wherein the first sleeve structure and the second sleeve structure are light impermeable and fitted with each other to form the retractable sleeve structure that is retractable.

7. The exchangeable optical principles demonstrating kit as claimed in claim 1, wherein the first sleeve structure and the second sleeve structure comprise a material selected from a paper based material, a PET based material, a PE based material, a HDPE based material, a PVC based material, a PP based material, a PC based material, a PLA based material and a combination thereof.

8. The exchangeable optical principles demonstrating kit as claimed in claim 1, wherein the exchangeable optical principles demonstrating kit forms the optical interference principle demonstrating device or the optical pinhole principle demonstrating device by exchanging the grating plate and the pinhole plate attached on the same retractable sleeve structure.

9. The exchangeable optical principles demonstrating kit as claimed in claim 1, wherein the pinhole opening has an aperture less than 1 mm and the slit opening has a width less than 1 mm.

* * * * *